Oct. 24, 1961 P. J. APOL 3,005,644

PAYROLL ACCOUNTING BOARD

Filed Feb. 18, 1960 5 Sheets-Sheet 1

INVENTOR.
PETER J. APOL
BY
Morgan, Finnegan, Durham & Pine
ATTORNEYS.

INVENTOR.
PETER J. APOL
BY
Morgan, Finnegan, Durham & Pine
ATTORNEYS.

Oct. 24, 1961 P. J. APOL 3,005,644

PAYROLL ACCOUNTING BOARD

Filed Feb. 18, 1960 5 Sheets-Sheet 3

INVENTOR.
PETER J. APOL
BY
Morgan, Finnegan, Durham & Pine
ATTORNEYS.

INVENTOR.
PETER J. APOL
BY
Morgan, Finnegan, Durham & Pine
ATTORNEYS.

INVENTOR.
PETER J. APOL
BY
Morgan, Finnegan, Durham & Pine
ATTORNEYS

United States Patent Office 3,005,644
Patented Oct. 24, 1961

3,005,644
PAYROLL ACCOUNTING BOARD
Peter J. Apol, 214 Lora St., Neptune Beach, Fla.
Filed Feb. 18, 1960, Ser. No. 9,648
3 Claims. (Cl. 282—29)

The present invention relates to sheet entry or copying apparatus for use in making from an original entry other entries or records at one writing. The invention relates more particularly to apparatus for systems of accounting wherein various entry sheets are maintained, e.g. apparatus for posting of payroll records wherein entries are made in a journal and earnings record concurrently with the drawing of employee's payroll salary checks or pay memorandum, and duplication media is interposed between adjacent sheets such as duplicating chemicals or carbon paper.

Heretofore many of the devices generally available for postings of multiple entry sheets have required repositioning and manual registration so that the devices could not be operated with speed or operated by clerical employees of little skill. Other present practice devices have failed to provide legible triplication of entries at one writing or did not permit the salary check to receive the original entry.

Those devices which could be operated for satisfactory triplication with speed by clerical employees of little skill have been of complex and costly construction—with a multiplicity of shafts, screws, cams, gears, etc. of sensitive tolerances.

The foregoing difficulties are obviated by the present invention.

Briefly, the present invention provides a simple apparatus having substantially no moving parts of sensitive tolerance. It can be manufactured easily at a low cost. Nevertheless, it is a mechanism for posting of entries from one writing simultaneously on three record sheets of differing lengths, widths and stock thicknesses. All of the entries are made on one writing line. Full triplication is achieved with high economical production output by persons of little skill. Salary checks can be used as the sheet of first entry and therefore receive the original writing. The records are prestacked and no additional stock need be added to the board during the posting operation. All three sheets are continuously pre-positioned with respect to each other and with respect to the writing area so that final registration during successive writings is achieved merely by a single motion which is automatically indexed and controlled. A smooth continuum of rigidly supported writing surface is maintained on the most convenient place on the board of the invention without bumps or interruption in the writing line. All entry sheets are rapidly removable seriatim or in bulk with little or no manipulation of the parts of the invention.

Speaking generally, this is accomplished by providing an apparatus consisting of a board having parallel side edges to form a writing space. Means at one edge of the board firmly clamp and hold a sheaf of first entry sheets, such as a sheaf of salary checks, to extend transversely across the writing space to be leafed thereon one at a time. A channel is formed along the check clamping side of the writing board and is adapted to receive and accommodate a slidable carriage for detachably holding and longitudinally moving a sheet of second entry, such as a journal, in registered position beneath a leafed-over sheet of first entry. On another side of the writing board, there is provided spaced sheet holding means for releasably holding a stack of sheets of third entry, such as earning records, in a registered position on the writing space beneath the sheets of first and second entry. The sheet holding means also releasably hold a leafed-over sheet of first entry in registered position relative to the writing space of the board.

The slidable carriage is provided with means for maintaining the carriage in a plurality of indexed positions as it is slid in the associated channel of the board, the index positions corresponding to the positions of successive lines of entry of the journal as each of the latter are registered relative to the writing space of the board. Although the upper surfaces of the platform and the carriage lie in parallel planes, the plane of the channel is inclined relative thereto so that longitudinal advancement of the carrier causes the latter's upper surface to move vertically through a distance related thereto. Preferably, the upper surface of the writing board is inclined upwardly from the foot to the head thereof. The top surface of the carriage is formed in a plane having an inclination generally equal to the inclination of the upper surface of the writing board, but the channel of the writing board for accommodation of the carriage is formed to lie in a horizontal plane. Thus, as the carriage is slid longitudinally along the horizontal plane from the foot to the head of the board, the upper surface of the carriage member moves vertically downwardly relative to the upper surface of the writing board through a vertical distance related to the distance of longitudinal advancement of the carrier member, the thickness of one earning record and the distance between successive lines of entry of the journal.

Other objects and advantages of the invention will be obvious herefrom or may be learned by practice of the invention, the same being realized or attained by means of instrumentalities and combinations pointed out in the appended claims. The accompanying drawings referred to herein and constituting a part hereof illustrate one embodiment of the invention and together with the description serve to explain the principles of the invention.

Figures 1, 2:
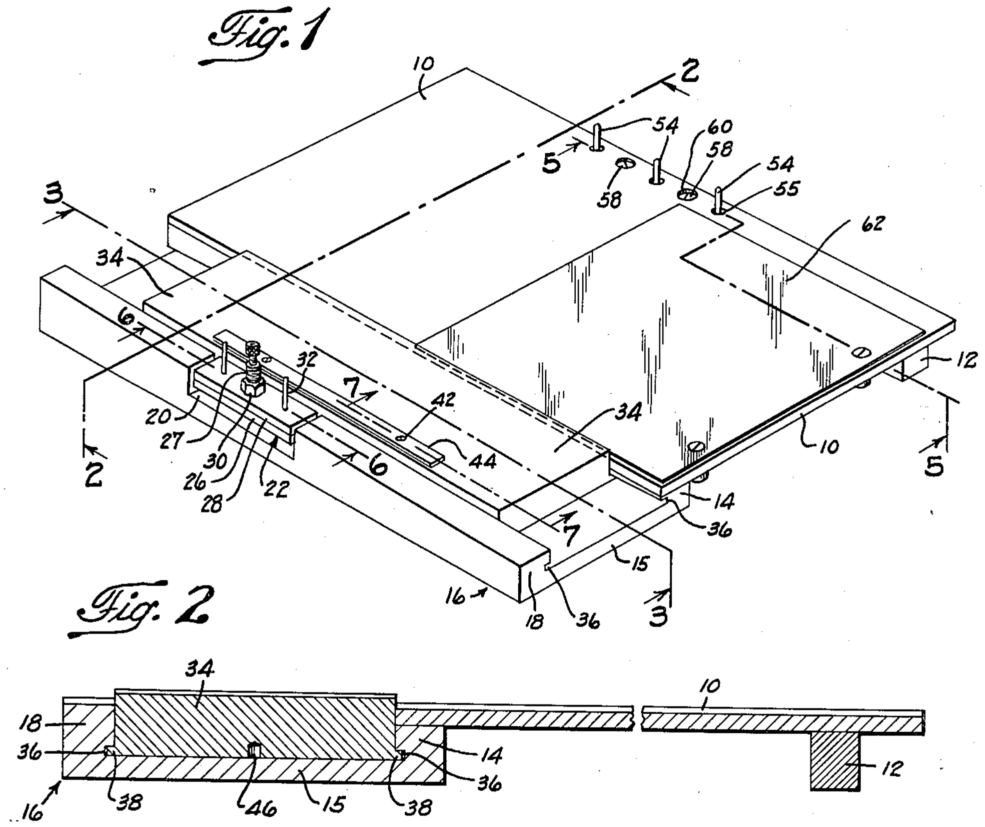
FIGURE 1 is a perspective view of the board of the invention prior to beginning of the posting operation.
FIGURE 2 is a sectional view taken along the line 2—2 of FIGURE 1.

Referring specifically to FIGURES 1 and 2 which illustrate a preferred embodiment of the present invention, the apparatus comprises a stationary platform 10 having substantially parallel side edges forming a writing space. Platform 10 is mounted at its right longitudinal side edge on a longitudinal support 12. The opposite side edge of platform 10 is mounted on upstanding leg portion 14 of a generally U-shaped channel or track member 16. As will be noted best in FIGURE 3, platform 10 has an upper flat surface in a plane inclined from the foot to the head thereof or from right to left as viewed in FIGURE 3.

The U-shaped track member 16 has a pair of upstanding leg portions 14, 18 with a base 15 therebetween extending from the foot to the head thereof.

Leg portion 18 of track member 16 has a middle cutout section 20 accommodating a clamping element 22. This cutout and the clamp are located longitudinally adjacent the extended writing area of the apparatus so that a sheaf of sheets of first entry can be secured by the clamping element in position to be leafed over the writing area of platform 10 one at a time. Clamping element 22 includes a threaded upright securing post 24 rotatably supported in leg 18 with suitable bearing, such as, ball joint 25. A sleeve 27 is threaded for vertical movement along post 24 and is provided with a lower clamping plate 26 fixed thereto. An upper clamping plate 28 is loosely mounted on sleeve 27 in opposed relationship with plate 26. In addition, sleeve 27 has a threaded section 29 on its outer periphery with a threaded knob 30 adapted for movement along the outer periphery of sleeve 27. Knob 30 is operative to bear against upper clamping plate 28, urging it into engagement with the top sheet of the sheaf of sheets of first entry, firmly maintaining the sheets in position between plates 26 and 28.

To prevent possible rotating or skewing of the sheets of first entry about post 24 which would cause misalignment thereof relative to the writing area, described further hereinbelow, cutout 20 and clamping plates 26 and 28 are provided with suitable openings on each side of post 24, for accommodating a pair of spaced, upright, impaling pins 32 which engage portions of the sheets of first entry, preventing movement thereof between clamping plates 26 and 28.

A carriage 34, with an upper flat surface for rigidly supporting a sheet of second entry, is positioned for longitudinal movement between the upstanding legs 14 and 18 above base 15 of track element 16. The inner facing sides of legs 14 and 18 each have longitudinal guideways 36 which are guiding means that accommodate outwardly protruding extensions or flanges 38 on carriage 34. Carriage 34 is thus mounted for longitudinal, sliding movement along one side of platform 10 from the foot to the head thereof in track element 16.

Figure 7:
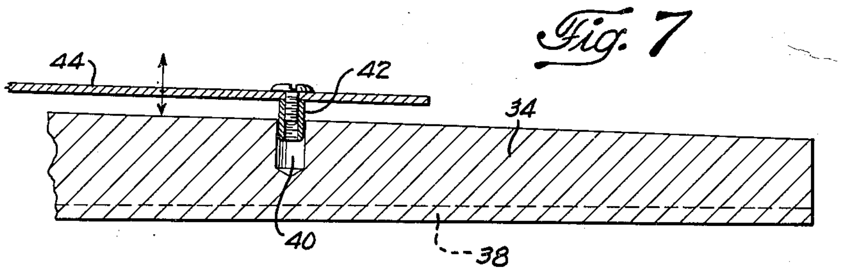
FIGURE 7 is a detailed sectional view taken along line 7—7 of FIGURE 1.
Figure 8:
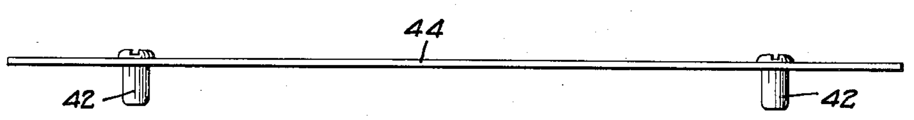
FIGURE 8 is a side elevation of the carriage clamp device.
Figure 9:
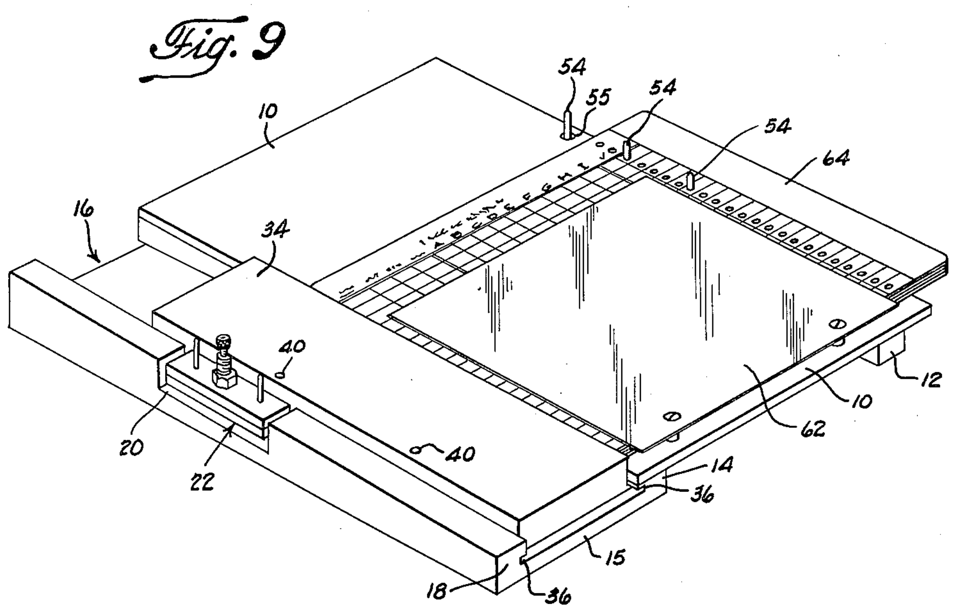
FIGURE 9 is a perspective view of the board of the invention with a plurality of earning records in place on the board as the third sheet of entry.
Figure 10:
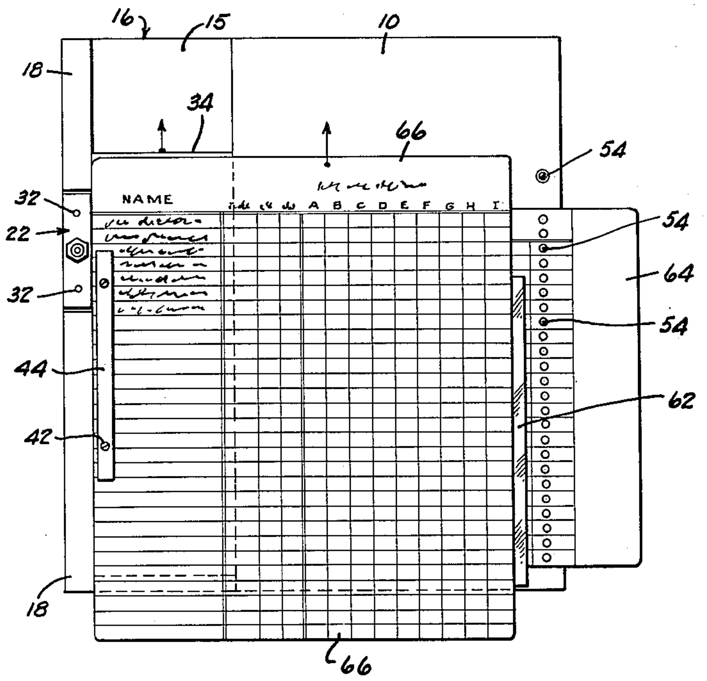
FIGURE 10 is a view similar to FIGURE 9 with a journal in place on the carriage as the second sheet of entry.
Figure 11:
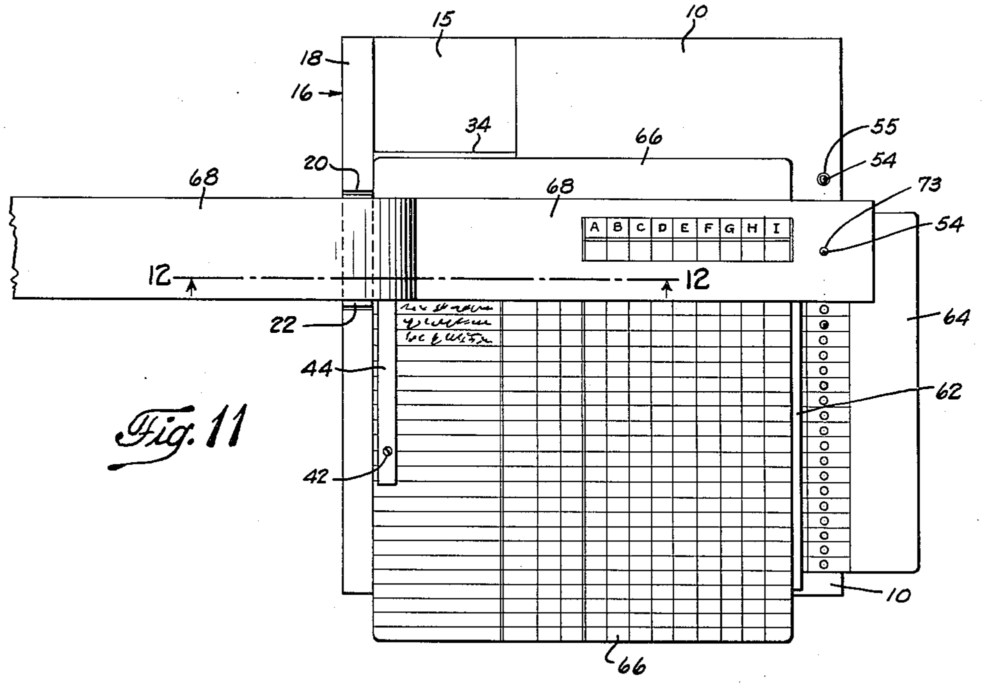
FIGURE 11 is a view similar to FIGURE 10 but in addition shows a sheaf of checks stacked for leafing on to the board as the first sheets of entry.
Figure 12:
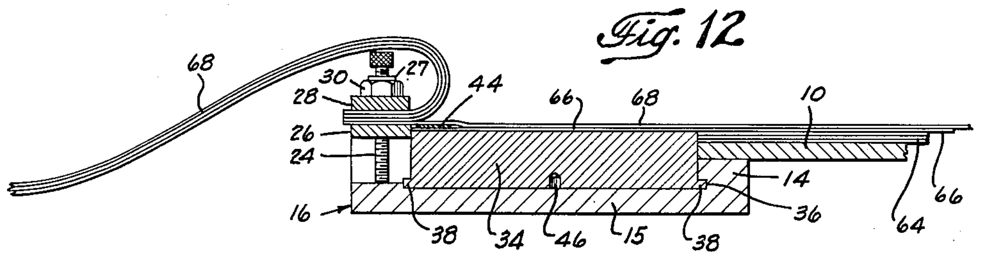
FIGURE 12 is a sectional view along the line 12—12 of FIGURE 11.
Figure 13:
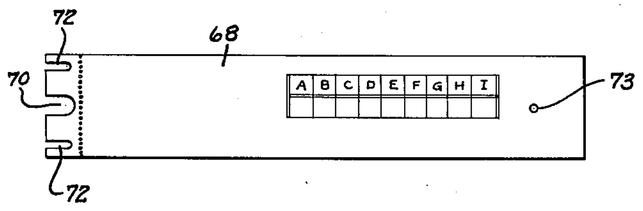
FIGURE 13 is a plan view of one of the sheets of first entry.

Carriage 34 also has spaced openings 40 along its left longitudinal edge which loosely hold adjustable studs 42 secured by screws to a clamping strip 44. See FIGURES 7 and 8. These spaced openings 40 are arranged in relation to the location of cooperating perforations in a sheet of second entry (i.e. a journal) so that, upon placement of the sheet under the clamp with the studs in the perforation and the sheet extended over the carriage and platform, the sheet will be pre-positioned laterally with respect to the writing area. See FIGURE 10.

Figure 4:
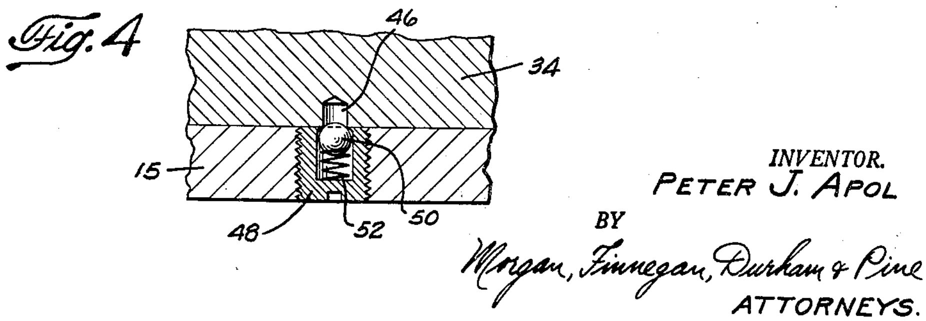
FIGURE 4 is a detailed view of the carriage indexing means taken along line 4—4 of FIGURE 3.
Figure 5:
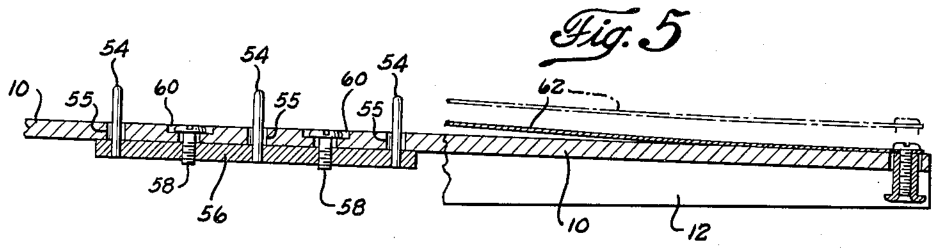
FIGURE 5 is a sectional view taken along line 5—5 of FIGURE 1.
Figure 6:
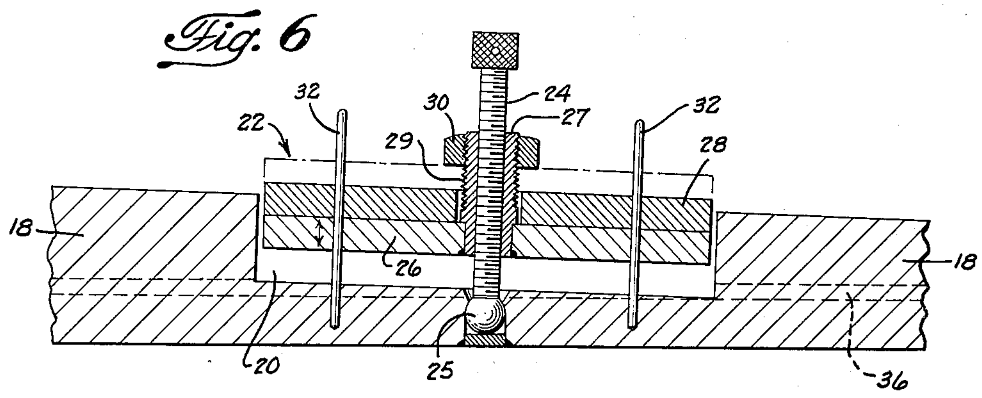
FIGURE 6 is a detailed view, partly in section, taken along line 6—6 of FIGURE 1.

A plurality of longitudinally aligned, spaced recesses 46 are formed centrally in the undersurface of carriage 34. Base 15 of track element 16, in turn, has a threaded insert 48 aligned with the recesses 46 and a ball shaped retaining member 50 urged by spring 52 against the underside of carriage 34 in the path of movement of recesses 46. As will be noted from FIGURE 4, the retaining member 50 releasably engages each recess of the recesses 46 in carriage 34 as the recess comes to opposed position to interrupt and index longitudinal sliding movement of carriage 34 in a series of desired successive positions as it moves along base 15. The spaces between the successive positions is pre-selected to coincide with the spaces between the successive lines of entry on the sheet of second entry, e.g. the journal.

Three sheet guiding means, namely, impaling pins 54 fixed to a bar 56 project through holes 55 in the upper surface of platform 10 adjacent support element 12. Bar 56, in turn, is secured to the undersurface of platform 10 by screws 58 set in holes 60 in platform 10. Holes 55 and 60 are oversized to permit minor sliding adjustment in the position of pins 54 on platform 10. Pins 54 are positioned in linear alignment from the foot or bottom of platform 10 toward the head thereof and are spaced from one another to cooperate with spaced perforations in a stack of sheets of third entry intended to be placed on platform 10. Pins 54 releasably hold the stack of sheets of third entry pre-positioned longitudinally and laterally on the upper surface of platform 10 with respect to the writing area with pin 54 preferably aligned with post 24 for reasons apparent hereinbelow.

Figure 3:
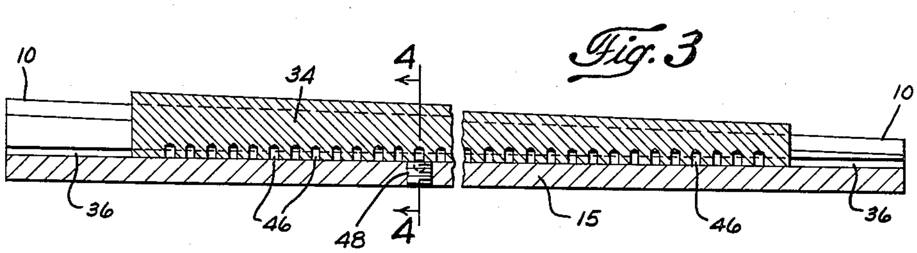
FIGURE 3 is a sectional view taken along line 3—3 of FIGURE 1.

As shown best in FIGURE 3, the upper surface of carriage 34 is in a plane substantially parallel to the inclined plane of the upper surface of platform 10. However, the guide means 36 of the track element 16 and the cooperating mounting flanges 38 of the carriage 34 are in a horizontal plane. Because of this angular difference between the plane of the latter guideways as compared with the planes of the upper surfaces of the carriage and platform, longitudinal movement of the carriage automatically causes a related vertical movement of the upper surface of the carriage relative to the upper surface of the platform. In the embodiment illustrated and described above, longitudinal movement of the carrier 34 toward the head of the platform 10 results in a vertical lowering of the upper surface of the carriage 34 relative to the upper surface of the platform 10. The aforementioned angular difference between the planes is preselected so that longitudinal movment of the carrier from one indexed position to the next indexed position will cause the carriage upper surface to be lowered a distance equal to the thickness of one sheet of third entry, e.g. an earnings record.

A transparent apron 62 made of Celluloid, cellulose acetate or the like is adjustably secured to platform 10 along the bottom edge thereof to protect any entry documents thereunder from inadvertent smudging.

In operation of the apparatus of the embodiment of the invention illustrated and described above, a stack of third sheets of entry, e.g. earning records 54, are placed on the upper surface of platform 10 under apron 62 with their left edge adjacent carriage 34 and the perforations of their right edge around pins 54. They are positioned on platform 10 with their desired line of entry aligned with the center impaling pin 54. This prepositions the entire stack of earnings records 64 both longitudinally and laterally with respect to the writing area.

The second sheet of entry, e.g. a journal 66, is then placed on the upper surface carriage 34 with its left edge fitted under clamping strip 44 and studs 42 fitted into cooperating perforations in the journal and its right portion extending over the stack of earnings records over the writing area. Carriage 34 with journal 66 secured in place thereon is slid longitudinally along base 15 and in channels 36 of track element 16 until the desired line of entry on journal 66 is registered in an index position with respect to the writing area.

The first sheets of entry, e.g. the salary checks 68, are then slid into position between upper and lower clamp plates 26 and 28 with the center cut-out portion 70 of check 68 positioned about post 24 and aligning slots 72 positioned around impaling pins 32. Knob 30 is then actuated to urge upper clamp plate 28 against the top check 68, firmly clamping the sheaf of checks 68 in position between plates 26 and 28. This pre-positions the entire sheaf of checks both longitudinally and laterally with respect to the writing area. The lower check is then registered automatically when leafed onto the board. Further, in order to avoid inadvertent misalignment by a heavy handed operator during the writing of the entries, the checks 68 are provided with an aperture 73 at the end thereof remote from slots 70 and 72 which cooperates with the center impaling pin 54, thus holding each check 68 firmly registered throughout the writing of the entries.

It will be understood that the first sheets of entry 68 and the second sheet of entry 66 used with the invention have duplication media such as carbon-treated paper and the like impressed on their underside. Alternatively, separate duplication media may be interposed between the first and second sheets of entry and between the second and third sheets of entry.

With the foregoing arrangement, all sheets of entry are pre-positioned, stacked, and in registration.

The original writing entries are then made by the operator on the writing line of the first sheet of entry. They are automatically triplicated without interruption in the second and third sheets of entry. The operator then, preferably with his right hand, raises the right edge of check 68 to clear the center pin 54 and tears off the check to remove it from the board. Simultaneously therewith and in the same motion, the operator uses his right hand to raise the right edge of the topmost earnings record 64 to celar pins 54 and this top third sheet of entry is simultaneously removed from the board. At this stage, all of the documents awaiting entry still remain pre-positioned despite the removal of the documents described above. Simultaneously with removal of check 68 and its associated earnings record 64, or shortly thereafter, the operator uses his left hand to slide carriage 34 along base 15 toward the head of the board until detent 50 engages the next successive recess 46. This single motion is unidirectional and automatically controlled. It advances the journal 66 to the next indexed position to register the second desired line of entry on journal 66, and it also automatically lowers the carriage a distance equal to the thickness of one earnings record. Thus, the upper surface of the carriage and the topmost earnings record left in the stack thereof are automatically aligned vertically to provide a smooth continuum supporting the journal, so that there are no interruptions or ledges in the writing area.

Figure 14:
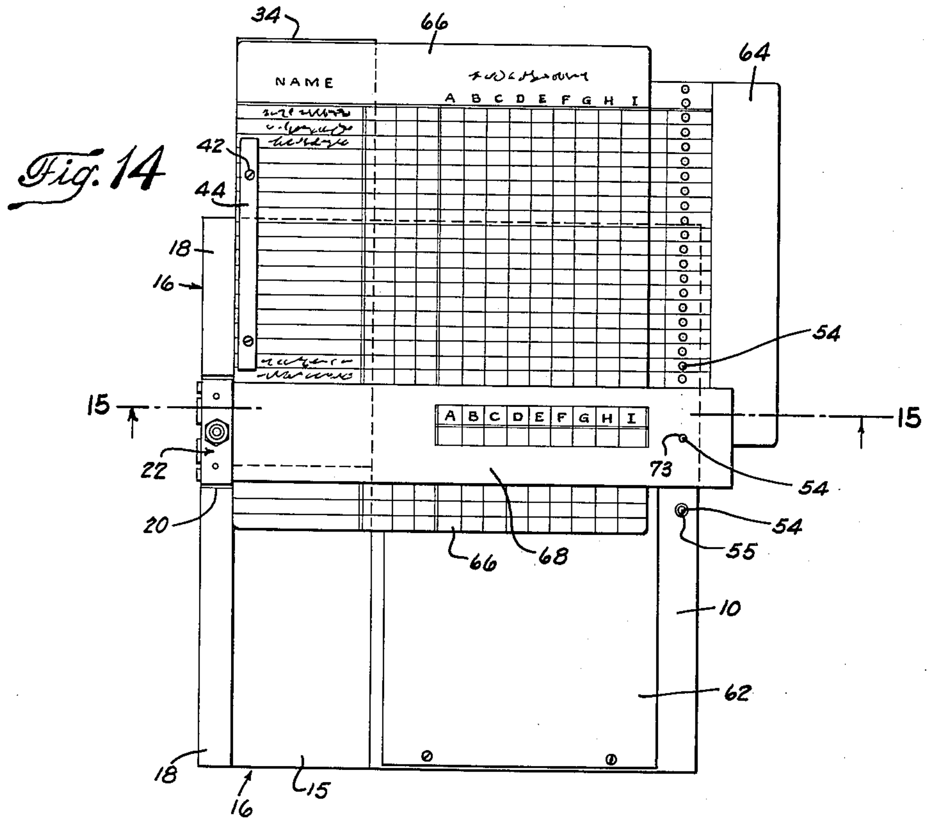
FIGURE 14 is a view similar to FIGURE 1 illustrating the board and records after completion of the posting operation with only one third sheet of entry, a second sheet of entry and only one first sheet of entry remaining on the board.
Figure 15:
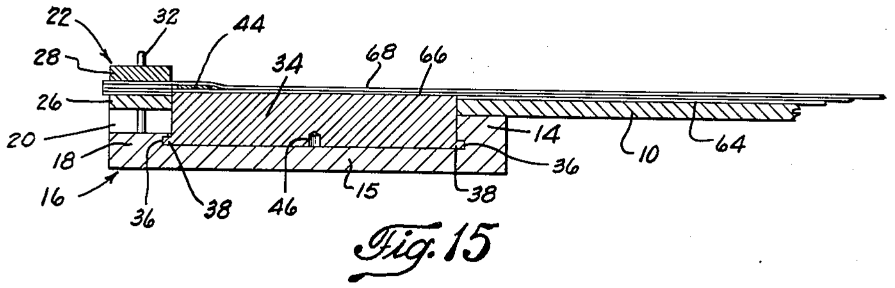
FIGURE 15 is a sectional view taken along the line 15—15 of FIGURE 1.

The operator then leafs the next check 68 from the bottom of the sheaf onto platform 10, which automatically registers the check. In almost all instances, perforation 73 at the free end of the check 68 is automatically placed on center pin 54 as well. The second writing of original entries is then made, and the operation is repeated until all of the records of the stack and sheaf are entered or until the journal sheet 66 has been advanced to the head of platform 10 (FIG. 14). New stacks or a new journal or both are then added, as desired for another posting operation.

At the next pay period, the operation is again repeated but during initial stacking the earnings records 64 are stacked on the platform and advanced one line space toward the head of the platform with the succeeding line of entry aligned with center pin 54. For this purpose, the earnings records are made with perforations matching each line thereon for cooperation with pins 54.

In the example described in operation above, the earnings records 64 each had a thickness of eight thousandths (0.008) of an inch and the journal 66 had entry lines spaced five sixteenths (5/16) of an inch apart. Accordingly, the recesses 46 were spaced apart five sixteenths (5/16) of an inch and the upper surfaces of the carriage 34 and platform 10 were provided with an angle of inclination to the horizontal plane to rise eight thousandths (0.008) of an inch for every five sixteenths (5/16) of an inch of longitudinal movement horizontally, or the angle of inclination was approximately 1°20′.

It should be understood that the above description has been made with reference to the preferred embodiment illustrated in the drawings and that slight modification and alteration can be made therein without departing from the invention, except as expressly limited hereinafter in the claims.

I claim:

1. A sheet entry and copying apparatus having a writing area extending laterally of the apparatus between the foot and head thereof for use in making entries on a plurality of sheets positioned thereon in superimposed relation with duplicating media therebetween comprising a stationary platform with an upper flat surface to rigidly support a stack of third sheets of entry, means supporting said platform, the platform having means adjacent a side edge thereof for removably mounting the third sheets of entry of said stack pre-positioned longitudinally and laterally with respect to the writing area, a track element fastened to a longitudinal side edge of said platform and extending from the foot to the head thereof, longitudinal guide means formed in said track element and extending from the foot to the head thereof, a carriage with an upper flat surface in a plane parallel to the plane of the upper flat surface of the platform to rigidly support at least part of a second sheet of entry, means mounting said carriage in said guide means and cooperating therewith for sliding longitudinal movement of the carrier from the foot to and from the head of said platform, means on said carriage for releasably holding said second sheet of entry thereon extending across the upper surface of the carriage and over the stack of third sheets of entry and pre-positioned laterally with respect to the writing area, clamping means on said platform adjacent the carriage for holding a sheaf of first sheets of entry pre-positioned longitudinally and laterally to extend transversely across the upper surface of the carriage and the platform above and registered with the second sheet of entry and the stack of third sheets of entry and to be leafed thereover one at a time, and means to index the longitudinal movement of the carriage to pre-determined successive positions on said track for registering successive portions of said second sheet of entry with the writing area and the other sheets of entry, and the plane of the track guide means and the cooperating carriage mounting means being inclined relative to the aforementioned planes to move the upper surface of the carriage through a vertical distance relative to the plane of the upper surface of the platform and related to the longitudinal movement of the carrier upon longitudinal movement of the carrier.

2. The subject matter of claim 1 characterized by the fact that the track element is fastened to the longitudinal side edge of said platform opposite to the longitudinal side edge having adjacent means for releasably holding the stack of third sheets of entry.

3. The subject matter of claim 1 characterized by the fact that the track element is fastened to the longitudinal side edge of said platform opposite to the longitudinal side edge having adjacent means for releasably holding the stack of third sheets of entry, said track element is of generally U-shaped cross-section including a pair of upstanding spaced legs and a base extending therebetween, a longitudinal guideway formed in the inner facing side of each of said legs along substantially the same length of said track element, and that said carriage mounting means including outwardly protruding longitudinal flanges to be received in said guideways for mounting said carriage for sliding longitudinal movement along and in said track element.

References Cited in the file of this patent

UNITED STATES PATENTS 2,861,819 Apol ---------------- Nov. 25, 1958